United States Patent [19]

van der Lely

[11] 4,175,623
[45] Nov. 27, 1979

[54] SOIL CULTIVATING IMPLEMENTS

[76] Inventor: Cornelis van der Lely, 7 Brüschenrain, Zug, Switzerland

[21] Appl. No.: 746,088

[22] Filed: Nov. 30, 1976

[30] Foreign Application Priority Data

Dec. 1, 1975 [NL] Netherlands .................. 7513962

[51] Int. Cl.² .............................................. A01B 33/06
[52] U.S. Cl. ............................................. 172/59; 172/96
[58] Field of Search ................ 172/96, 91, 522, 526, 172/544, 543, 117, 59, 49, 711

[56] References Cited

U.S. PATENT DOCUMENTS

| | | | |
|---|---|---|---|
| 2,275,446 | 3/1942 | Leeper | 172/117 |
| 3,150,721 | 9/1964 | Lely | 172/96 |
| 3,667,551 | 6/1972 | Lely | 172/59 |
| 3,774,689 | 11/1973 | Lely et al. | 172/522 |
| 3,897,831 | 8/1975 | Lely | 172/59 |

FOREIGN PATENT DOCUMENTS 608051  9/1948  United Kingdom ..................... 172/71

Primary Examiner—Richard J. Johnson

[57] ABSTRACT

A cultivator has driven soil working members mounted on corresponding upwardly extending shafts and each member includes a support with a hub secured near the lower end of a respective shaft. The support is formed from flat sheet material which define resilient arms that extend outwardly from the hub. Preferably, the arms include two spaced apart parallel strips with a holder near the outer ends of the two strips. Fasteners, such as bolts, clamp the arms together and the strips of neighboring arms can be integral with one another. The arms and corresponding tines are thus deflectable in directions perpendicular to the planes of the strips.

8 Claims, 4 Drawing Figures

SOIL CULTIVATING IMPLEMENTS

Figure 1:
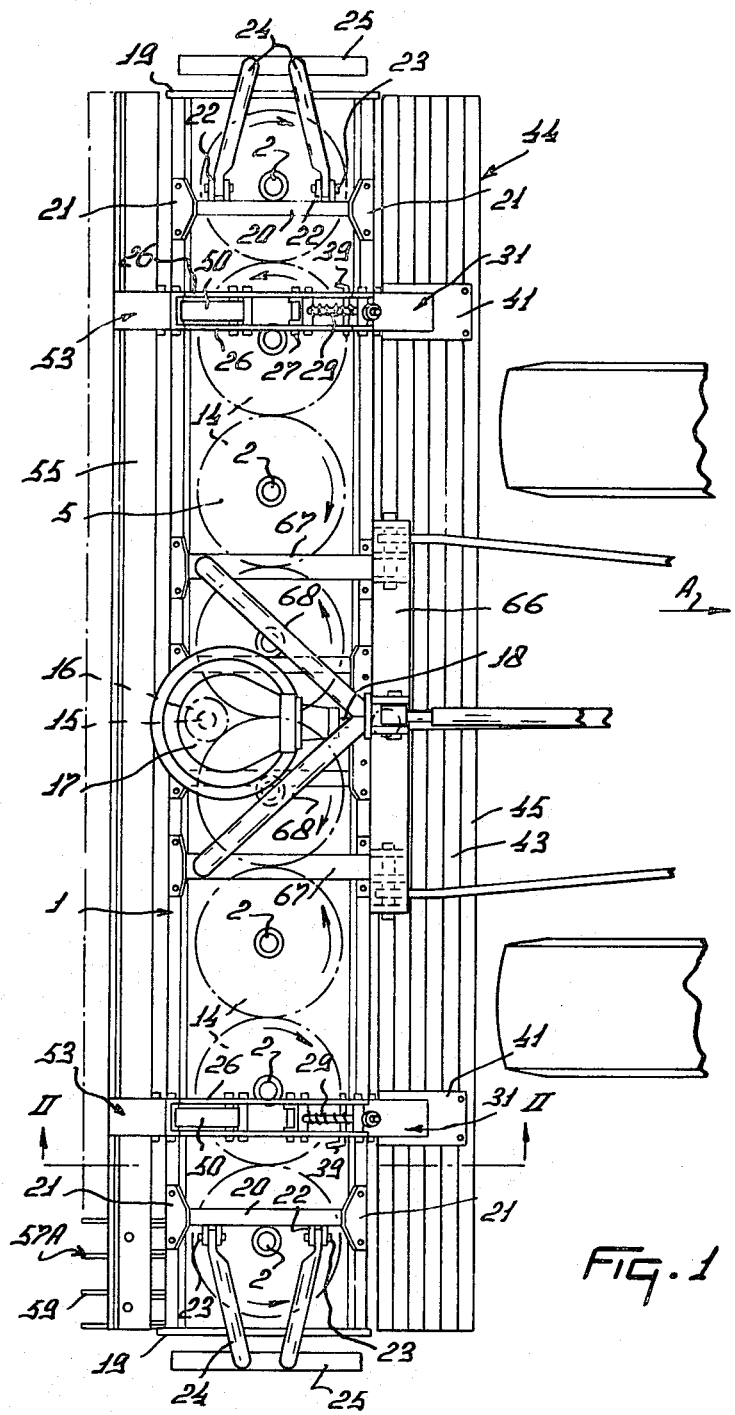
Figure 2:
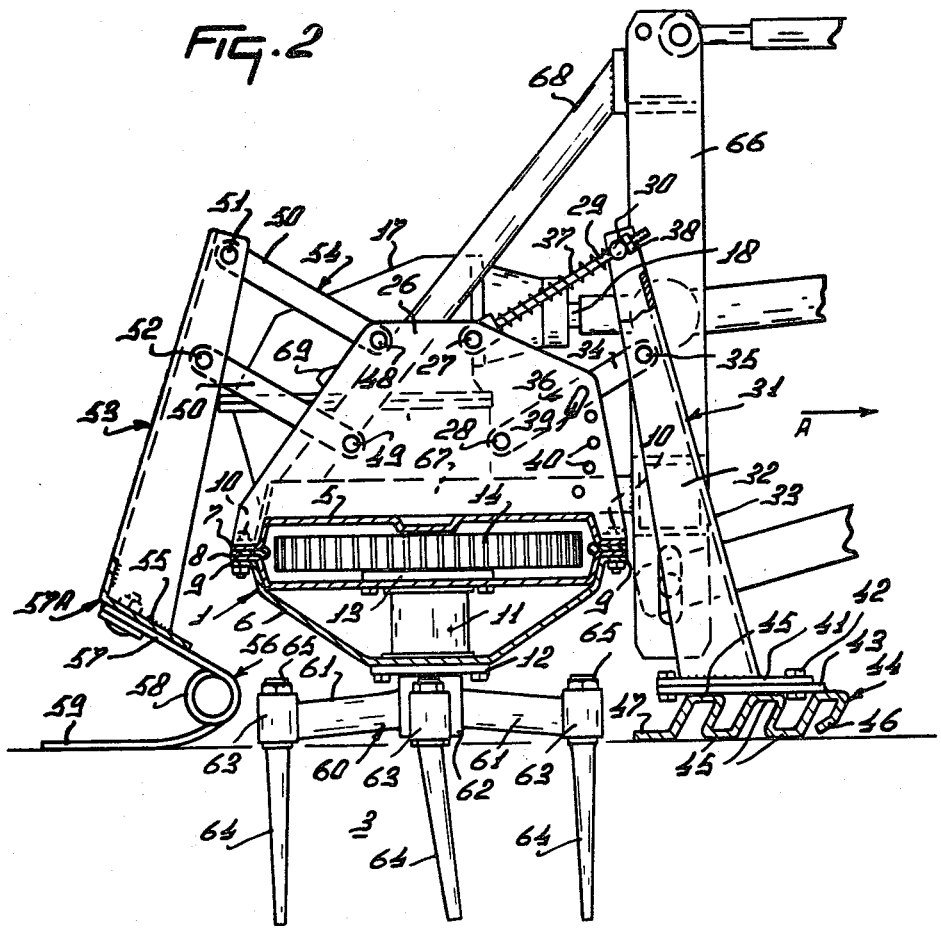
Figure 3:
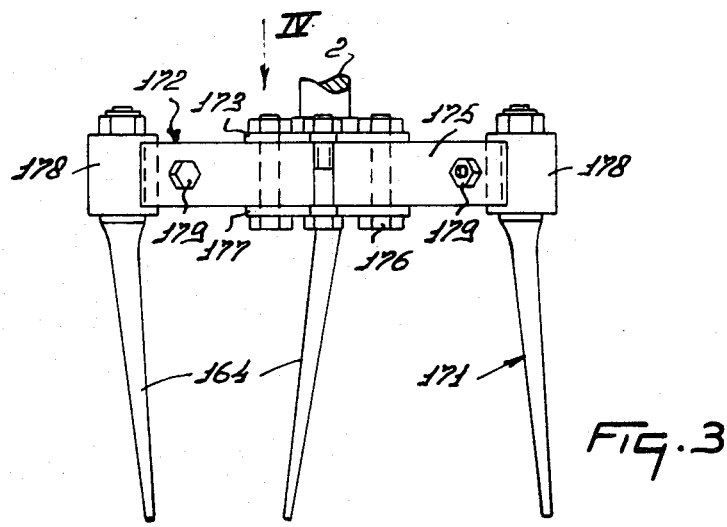
Figure 4:
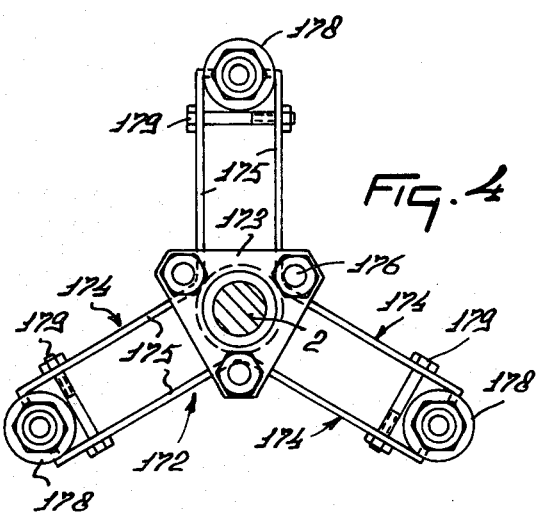

For a better understanding of the invention, and to show how the same may be carried into effect, reference will now be made, by way of example, to the accompanying drawings, in which:

FIG. 1 is a plan view of a soil cultivating implement which can be provided with cultivating members in accordance with the invention and which is connected to the rear of an agricultural tractor, FIG. 2 is a section, to an enlarged scale, taken on the line II—II in FIG. 1, FIG. 3 is an elevation illustrating a preferred rotary soil working or cultivating member of the invention, and FIG. 4 is a plan view of the member of FIG. 3.

Referring firstly to FIGS. 1 and 2 of the drawings, the soil cultivating implement or machine that is illustrated therein has a frame which includes a hollow box-shaped frame portion 1 that extends substantially horizontally transverse, and usually substantially perpendicular (as illustrated), to the intended direction of operative travel of the implement which is indicated by an arrow A in FIG. 1 of the drawings and in the same way in the following Figures of drawings. A plurality (in this case, eight) of substantially vertical, or at least upwardly extending, shafts 2 are rotatably journalled in the hollow frame portion 1 in a single row that extends parallel to the length of that portion and thus perpendicular or substantially perpendicular to the direction A. The axes of rotation of the eight shafts 2 are spaced apart from one another by regular intervals of exactly, or substantially, 37,5 centimeters and the lowermost end of each shaft 2 that projects from beneath the bottom of the hollow frame portion 1 has a corresponding rotary soil working or cultivating member 3 firmly but releasably secured to it. The frame portion 1 is formed principally from steel sheet and comprises an upper gear casing 5 and an underlying trough 6, the substantially horizontal longitudinal axes of the casing 5 and trough 6 being parallel or substantially parallel to one another. As can be seen best in FIG. 2 of the drawings, the gear casing 5 has a substantially oblong cross-section whereas the trough 6 which lies beneath it has a cross-section which is substantially trapezoidal, the broad base of the trapezium being uppermost to coincide with the bottom of the substantially oblong casing 5. The casing 5 has upper and lower walls that are both formed from sheet steel, the top wall comprising a substantially horizontal central portion that is bent over downwardly in a symmetrical manner at both its front and rear edges with respect to the direction A. The downwardly bent-over portions terminate in horizontal or substantially horizontal clamping rims 7 that extend throughout the transverse length of the whole frame portion 1.

The lower wall of the casing 5 has a horizontal or substantially horizontal central portion which is bent over upwardly, in a symmetrical manner, at its front and rear edges, with respect of the direction A, the bent-over portions terminating in horizontal or substantially horizontal clamping rims 8. The two downwardly bent-over portions and clamping rims 7 of the upper wall of the casing 5 are not only symmetrical with respect to one another but are also symmetrical with respect to the two upwardly bent-over portions and the corresponding clamping rims 8 of the lower wall of the casing 5 and, with this arrangement, the clamping rims 7 and 8 co-operate with an intervening hard strip-shaped synthetic plastics gasket at a level midway between that of the general plane of the upper wall and the general plane of the lower wall of the casing 5. That part of the trough 6 which is not afforded by the lower wall of the casing 5 takes the form of a sheet steel plate having a horizontal or substantially horizontal central portion that is flanked by symmetrically upwardly bent-over portions whose upper edges merge into more steeply upwardly bent-over portions that bear against the outer surfaces of the upwardly bent-over portions of the lower wall of the casing 5. These portions of the lower wall of the trough 6 terminate in horizontal or substantially horizontal clamping rims 9 that extend throughout the transverse length of the frame portion 1 and lie beneath the clamping rims 8. The rims 7 and 8 of the upper and lower walls of the casing 5 are clamped to the intervening gasket by a plurality of vertically disposed bolts 10 and it is preferred that further bolts (not shown) should alternate with the bolts 10 to secure the rims 9 of the lower wall of the trough 6 to the overlying rims 7 and 8. The clamping rims 9 of the lower wall of the trough 6 afford a support for the gear casing 5 and, with the preferred arrangement that has just been mentioned, the further bolts can be withdrawn to allow the lower wall of the trough 6 to be removed without having to break the seal between the rims 7 and 8 of the upper and lower walls of the gear casing 5.

The lower wall of the casing 5 and the central portion of the lower wall of the trough 6 are formed with rows of vertically registering holes whose centers are spaced apart from one another along the rows by the same distances as are the axes of rotation of the shafts 2, said distances thus being exactly, or substantially, 37.5 centimeters. The registering holes receive the upper and lower ends of bearing housings 11 that are provided with vertically aligned bearings (not visible) for the rotary support of the corresponding shafts 2. The lower end of each bearing housing 11 comprises a flange 12 that is bolted to the central substantially horizontal portion of the lower wall of the trough 6 while the upper end of each bearing housing 11 is of slightly reduced diameter as compared with the remainder thereof, the reduced diameter portion extending through the corresponding hole in the lower wall of the casing 5 and upwardly for a short distance into that casing. The upper end co-operates with a surrounding and closely fitting ring 13 that is bolted to the lower wall of the casing 5 around the respective hole therein. The ring 13 has a rim or shoulder that penetrates downwardly through said hole into the chamber defined by the trough 6 and sealing rings or other gaskets (not visible) are provided between the lower surface of the ring 13 and the upper surface of the lower wall of the casing 5 and in a circumscribing groove formed in the reduced diameter portion of the housing 11 between that portion and the surrounding downwardly directed rim or shoulder of the ring 13. Oil or other lubricant will normally be contained inside the gear casing 5 and the arrangement that has just been briefly described is effective in preventing that oil or other lubricant from leaking downwardly from the casing 5 into the hollow interior of the chamber that is defined by the trough 6. The upper ends of the shafts 2 extend above the bearing housings 11 into the casing 5 and are there provided with corresponding straight-toothed or spur-toothed pinions 14 whose sizes and arrangements are such that the teeth of each pinion 14 are in mesh with those of the neighbouring pinion, or with those of each of the two neighbouring pinions, in the single row thereof.

The frame portion 1 is provided, substantially midway across the width thereof, with a substantially vertical shaft 15 carrying a pinion 16 whose teeth are in mesh with those of one of the center pair of the row of eight pinions 14. The shaft 15 and pinion 16 are near the rear of the frame portion 1 with respect to the direction A and the shaft 15 is rotatably mounted in substantially vertically aligned bearings that are carried by the top and bottom walls of the gear casing 5, said shaft 15 projecting upwardly beyond the upper one of those bearings into a gear box 17 that is mounted on top of the casing 5 substantially midway across the width thereof. The shaft 15 is provided, inside the gear box 17, with a bevel pinion (not visible) whose teeth are in driven mesh with those of a further bevel pinion (not visible) carried by a substantially horizontal shaft 18 that extends substantially parallel to the direction A and whose leading end projects forwardly from the front of the gear box 17 to act as a rotary input shaft of that gear box. When the implement is in use, the forwardly projecting splined or otherwise keyed end of the shaft 18 is placed in driven connection with the power take-off shaft of an agricultural tractor or other operating vehicle by way of an intermediate telescopic transmission shaft, that is of a construction which is known per se, having universal joints at its opposite ends.

The opposite ends of the hollow frame portion 1 are closed by substantially vertical side plates 19 that are in parallel relationship with one another and substantially parallel relationship with the direction A. Two supports 20 are carried by brackets 21, secured to the upper clamping rims 7, so as to extend parallel or substantially parallel to the direction A at locations that are spaced inwardly from the side plates 19 of the frame portion 1 by distances which are such that said support 20 are located very close, as seen in plan view (FIG. 1), to the two shafts 2 that correspond to the two rotary soil working or cultivating members 3 that are at the opposite ends of the row of eight of those members. Each support 20 carries two pairs of spaced lugs 22 that are directed towards the neighbouring end of the frame portion 1, the two lugs 22 of each pair being interconnected by a corresponding substantially horizontal pivot pin 23 that is in substantially parallel relationship with the direction A and with the other three pivot pins 23. Each pivot pin 23 has one end of a corresponding arm 24 turnably mounted on it, between the two lugs 22 of the corresponding pair, and it will be seen from FIG. 1 of the drawings that the two arms 24 which correspond to each support 20 initially extend outwardly to locations beyond the upper edge of the corresponding side plate 19 in convergent relationship with one another. The arms 24 are then bent over downwardly and are secured to the tops of corresponding shield plates 25 which are substantially vertically disposed so as to extend substantially parallel to the direction A. The lowermost edges of the shield plates 25 are shaped to slide over the ground surface in the direction A and it will be evident that each shield plate 25, and the corresponding pair of arms 24, is turnable upwardly relative upwardly and downwardly to the frame portion 1 about the axis defined by the corresponding pair of pivot pins 23. This enables the shield plates 25 to match undulations in the surface of the ground that may be met with during operative travel in the direction A. The shield plates 25 cooperate with the neighbouring soil working or cultivating members 3 in working the soil and in preventing substantial ridging thereof at the margins of the broad strip of land that is worked by the implement and also act to prevent stones and other items that may be met with by the rapidly rotating soil working or cultivating members 3 from being flung laterally of the path of travel of the implement thus greatly reducing the danger of damage and/or injury from this cause.

The top of the hollow frame portion 1 is also provided, at two locations which are spaced inwardly from the corresponding side plates 19 by distances which are greater than the spacing therefrom of the supports 20, with corresponding pairs of substantially vertical plates 26, all four plates 26 being substantially parallel to one another and to the direction A. The plates 26 have a somewhat irregular shape which can, however, be seen clearly in FIG. 2 of the drawings, the two plates 26 of each pair being interconnected by an upper stub shaft 27 and a lower stub shaft 28, said stub shafts 27 and 28 defining axes that are substantially horizontally perpendicular to the direction A and the lower stub shaft 28 being a little further advanced with respect to said direction A than is the upper stub shaft 27. However, both the upper and lower stub shafts 27 and 28 of each pair are in front of an imaginary vertical plane containing the axes of rotation of all of the shafts 2 with respect to the direction A. Each upper stub shaft 27 has a forked bracket turnably mounted thereon between the corresponding pair of plates 26 and a rod 29 projects from the base of said bracket in a direction perpendicular to the longitudinal axis of the stub shaft 27 concerned. At a distance from the forked bracket, each rod 29 is entered through a perpendicular bore midway along a cylindrical block 30 that is mounted so as to be turnable about the longitudinal axis of the cylinder between the upper end of a pair of downwardly, and forwardly with respect to the direction A, inclined strips 32 whose widths in the direction A progressively increase from top to bottom (see FIG. 2). The leading edges of each pair of strips 32 are perpendicularly interconnected by a corresponding transverse portion 33 which is conveniently, but not essentially, integral with the two strips 32. Each pair of strips 32 and the corresponding transverse portion 33 together form an arm 31 which thus, like the strips 32, is downwardly and forwardly inclined from top to bottom with respect to the direction A.

A strip-shaped arm 34 has one end turnably arranged around each lower stub shaft 28 between the corresponding pair of plates 26, the opposite end thereof being turnably connected to the corresponding arm 31 by a substantially horizontal stub shaft 35 that perpendicularly interconnects the corresponding strips 32 in substantially parallel relationship with the stub shafts 27 and 28 and the longitudinal axes of the cilindrical blocks 30. FIG. 2 of the drawings shows that the stub shafts 27, 28 and 35 and the blocks 30 are at the four corners of corresponding pivotable linkages that are in the form of parallelogram linkages 36 so that the arms 31 are movably upwardly and downwardly, without significant tilting, relative to the hollow frame portion 1. Each rod 29 has a corresponding helical compression spring 37 wound around it so as to bear between the base of the corresponding forked bracket and one side of the corresponding cylindrical block 30. Each rod 29 is screwthreaded in the region of the corresponding block 30 and a nut 38 is mounted on the screwthreaded portion so as to be axially adjustable in position along that portion. Each spring 37 thus tends to maintain the corresponding block 30 firmly against the corresponding nut 38 but it will be realised that each arm 31 can, when required, turn about the corresponding stub shaft 35 in an anti-clockwise direction as seen in FIG. 2 of the drawings against the action of the corresponding spring 37. The position of the nuts 38 axially along the screwthreaded portions of the rods 29 control the extents to which the springs 37 are initially compressed and, it will be realised, govern the exact shapes of the parallelogram linkages 36, that is to say, they dictate whether said linkages 36 are true parallelograms or deviate marginally from exact parallelism. Each strip-shaped arm 34 is formed with a hole at a location substantially midway between the corresponding stub shafts 28 and 35 and each pair of substantially vertical plates 26 is formed with corresponding curved rows of substantially horizontally aligned holes 40 that are all at the same distance from the stub shaft 28 concerned. Horizontal locking pins 39 are provided for entry through chosen pairs of the holes 40 and the hole in the intervening arm 34 and it will be evident that the particular pair of holes 40 that is chosen in each pair of plates 26 for co-operation with the corresponding locking pin 39 dictates the level of the corresponding arm 31 relative to the level of the frame portion 1.

The lowermost end of each arm 31 has a substantially horizontal support plate 41 welded or otherwise rigidly secured to it so as to extend substantially parallel to the direction A. Substantially vertically disposed bolts 42 firmly but releasably fasten a support 43 of a soil crumbling member 44 to the lower surface of each support plate 41, said soil crumbling member 44 also serving to support the implement from the ground surface during its use. The soil crumbling member 44 extends substantially horizontally parallel to the transverse length of the hollow frame portion 1 and thus perpendicular or substantially perpendicular to the direction A, said member 44 being releasably fastened to the two support plates 41 so as to extend throughout the working width of the immediately following rotary soil working or cultivating members 3. The implement supporting soil crumbling member 44 is in the form of a bent plate that is elongate in a direction parallel to the length of the hollow frame portion 1, the cross-sectional shape of the plate being clearly visible in FIG. 2 of the drawings. In fact, the ribbed plate comprises three upper portions 45 that are all substantially horizontally disposed with their fore and aft widths substantially parallel to the direction A, two similarly disposed lower portions 45 and a single free rear portion 47 that is coplanar with the two lower portions 45, having the same, or substantially the same, width as those portions 45 in the direction A. The free rear portion 47 and the upper and lower portions 45 are integrally interconnected by a number of substantially flat limbs that all extend obliquely upwardly and forwardly, with respect to the direction A, from bottom to top. The leading upper portion 45 has its front edge integrally connected to a free limb that is of a different shape to the other five limbs of the soil crumbling member 44. Said leading limb comprises a first portion which extends obliquely downwardly and rearwardly with respect to the direction A from the front edge of the leading upper portion 45 in parallel relationship with the other five limbs but, at a level approximately midway between that of the upper and lower portions 45, said leading limb is bent over obliquely rearwardly to form an edge portion 46 that terminates at a level which is just clear of the ground surface when the impelemnt is employed on flat land. In fact, as seen in FIG. 2 of the drawings, the cross-section of the bent plate which principally affords the soil crumbling member 44 is such as to define a series of alternately upright and inverted oblique-limbed U's, only the leading limb which incorporates the edge portion 46 and the free rear portion 47 departing from this configuration. The free rear portion 47 projects substantially horizontally rearwardly from its integral junction with the lower edge of the rearmost oblique limb of the member 44. It can be seen in FIGS. 1 and 2 of the drawings that the locations at which the lower ends of the two arms 31 are secured to the two support plates 41 are towards the rear of the implement-supporting soil crumbling member 44 with respect to the direction A.

Rear regions of the substantially vertical plates 26 that are behind an imaginary vertical plane which contains the axes of rotation of all eight of the shafts 2 with respect to the direction A carry upper and lower stub shafts 48 and 49 which stub shafts perpendicularly interconnect the two plates 26 of each pair with the upper stub shafts 48 being a little further advanced with respect to the direction A than are the lower stub shafts 49. The leading ends of upper and lower arms 50 are turnably mounted on the stub shafts 48 and 49 between the two plates 26 of the corresponding pairs and the rearmost ends of said arms 50 are turnably connected by upper and lower stub shafts 51 and 52 to parallel strips that form parts of two arms 53. The two arms 53 are of basically similar formation to the two arms 31, being of channel-shaped cross-section with the two parallel limbs of each arm integrally, or rigidly, interconnected at the rear thereof with respect to the direction A, each arm 53 being of progressively increasing width in the direction A from its top to substantially its bottom. It will be evident from FIG. 2 of the drawings that the stub shafts 48, 49, 51 and 52 are located at the four corners of pivotable linkages in the form of parallelogram linkages 54, the arms 53 thus being displaceable upwardly and downwardly relative to the hollow frame portion 1 without significant tilting.

The lower ends of the arms 53 are welded or otherwise rigidly secured to a single support beam 55 having the angular cross-section which can be seen in FIG. 2 of the drawings. The support beam 55 extends substantially horizontally parallel to the transverse length of the hollow frame portion 1 and thus perpendicular or substantially perpendicular to the direction A, said support beam 55 being of substantially the same length as the soil crumbling member 44 and being in register therewith in the direction A so as to cover the whole of the working width of the immediately foregoing row of rotary soil working or cultivating members 3. It can be seen from FIG. 2 of the drawings that the angular cross-section beam 55 comprises a lower and larger limb that is inclined downwardly and forwardly with respect to the direction A from its integral junction with an upper and smaller limb that is inclined upwardly and forwardly from said junction with respect to the same direction. The lower and larger limb of the support beam 55 has a plurality of tine-like elements 56 secured to its lower surface by bolts and clamping, the arrangement being such that said elements 56 are spaced apart from one another at short but substantially regular intervals along the whole length of the support beam 55. Each element 56 is formed from spring steel or other resilient material that is preferably, but not essentially, of circular or substantially circular cross-section and conveniently, as illustrated, said elements 56 are made in integral pairs, the junctions between said pairs being the parts that are secured to the lower surface of the support beam 55 by the bolts and clamping plates. Each element 56 comprises a first substantially straight portion 57 that is inclined downwardly and forwardly with respect to the direction A from the integral junction thereof with the equivalent portion 57 of the immediately neighbouring element 56. The leading lower end of each straight portion 57 merges into a helical coil 58 the opposite end of which is downwardly and rearwardly directed so as integrally to join a second horizontal or substantially horizontal portion 59 that is bentover so as to extend parallel or substantially parallel to the direction A while bearing against the surface of the ground when the implement is in use. The support beam 55 and the elements 56 together afford a rear soil crumbling member that is generally indicated by the reference 57A.

Each of the shafts 2 projects from beneath the lower surface of the central portion of the lower wall of the trough 6 and is there splined to receive the hub 62 of a corresponding substantially cruciform support 60 that also comprises four arms 61 which radiate substantially horizontally (see FIG. 2) from the hub 62 at 90° intervals around the axis of the shaft 20 concerned. In fact, each arm 61 is inclined by a few degrees to the horizontal in such a way that the end thereof which joins the hub 62 is at a slightly higher level than is the opposite and outer end. The outer ends of all four of the arms 61 of each support 60 carry four corresponding substantially cylindrical sleeve-like tine holders 63 in which are firmly but releasably secured fastening portions of four corresponding rigid soil working tines 64. Each tine 64 also comprises a soil working portion that extends downwardly into the ground from its integral junction with the upper fastening portion and it is preferred, but is not essential, that said soil working portion should trail rearwardly from top to bottom by a few degrees with respect to the intended direction of operative rotation of the corresponding soil working or cultivating member 3 (see the small arrows which indicate these directions of rotation in FIG. 1). The soil working portions of the tines 64 are of downwardly tapering configuration and the fastening portions thereof are retained in the corresponding holders 63 by fastenening nuts 65 which bear against the upper ends of the holders 63 and co-operate with short screwthreaded upper parts of the tine fastening portions. A coupling member of trestle 66 is secured to the front of the hollow frame portion 1 with respect to the direction A at a position midway between the parallel general planes of the two side plates 19. The coupling member of trestle 66 is of substantially triangular configuration as seen in front or rear elevation, substantially its two lower corners being connected to supports 67 that extend substantially horizontally parallel to the direction A on top of the gear casing 5 of the hollow frame portion 1. The apex of member 66 is connected to two locations that are close to the rearmost ends of the two supports 67 by a pair of tie beams 68 that diverge both downwardly and rearwardly with respect to the direction A.

Before work commences using the soil cultivating implement that has been described with reference to FIGS. 1 and 2 of the drawings, the leading soil crumbling member 44 that supports the implement form the ground surface is set at a level relative to that of the hollow frame portion 1 which is appropriate to the desired maximum depth of penetration of the tines 64 of the members 3 into the soil. This level is dictated by the particular pairs of holes 40 that are chosen for cooperation with the locking pins 39 and the holes in the intervening arms 34 and it is noted that FIG. 2 of the drawings illustrates the soil crumbling member 44 positioned at a level that is appropriate to the greatest depth of penetration of the tines 64 into the soil which can be attained. The coupling member or trestle 66 is connected to the three-point lifting device or hitch at the rear of the agricultural tractor or other operating vehicle in the generally known manner which can be seen in outline in the drawings and the power take-off shaft of the same tractor or other operating vehicle is placed in driven connection with the splined or otherwise keyed forwardly projecting end of the shaft 18 by way of the known telescopic transmission shaft that has universal joints at its opposite ends. As the implement moves over a field in the direction A, its soil working or cultivating members 3 are rapidly revolved in the directions that are indicated by the small arrows in FIG. 1 of the drawings and, since diametrically opposed pairs of tines 64 of each member 3 are spaced apart from one another by somewhat greater distance than the spacing between the axes of rotation of the shafts 2, the strips of land that are worked by the individual members 3 overlap one another to form, in effect, a single broad strip of worked soil, The implement-supporting soil crumbling member 44 that immediately precedes the row of rotary soil working or cultivating members 3, levels, or substantially levels, a strip of land which coincides with, and has the same width as, the strip that is worked by the members 3. The particular cross-sectional shape of the bent plate that wholly or principally affords the member 44 is particularly effective in producing a satisfactory levelling and crumbling of the soil that is to be worked by the members 3. The lower portions 45 of the plate co-operate in levelling and crumbling the soil while the upper portions 45 act principally to crumble any lumps of earth that move over the top of the member 44. The lower portions 45 do most of the levelling and this is enhanced by the free rear portion 47 that is substantially coplanar with said lower portions 45. The downward and rearward, with respect to the direction A, inclination of the limbs which interconnect the portions 45 and 47 and the steeper inclination of the leading edge portion 46 ensure that the soil crumbling member 44 exerts a downward force upon anything that may stick to the bottom of the member 44 so that, sooner or later, any adhering material will tend to be cleaned off. The bottom to the soil crumbling member 44 provides a relatively large area of contact with the ground surface and said member is thus effective in supporting the implement from the ground while it is in operation.

The connections of the lower ends of the arms 31 to the support plates 41 of the soil crumbling member 44 at locations which are towards the rear of that member enable the front thereof with respect to the direction A to be displaced upwardly, with the frame portion 1 and the rotary soil working or cultivating members 3, in the event that a large stone or other firmly embedded obstacle is met with. If a large loose stone, for example, should become momentarily jammed between one or more of the rotary members 3 and the soil crumbling member 44, the arms 31 can turn forwardly about the axis defined by the stub shafts 35 in an anticlockwise direction as seen in FIG. 2 of the drawings, against the action of the springs 37, until said stone or the like is released. The springs 37 then immediately and automatically bring the cylindrical blocks 30 back into contact with the adjustable stop nuts 38. Since the implement-supporting soil crumbling member 44 is connected to the frame portion 1 through the intermediary of the parallelogram linkages 36, said member does not tilt significantly when it is adjusted to a different horizontal level relative to that of the frame portion 1 and thus maintains its optimum disposition relative to the ground surface. It is noted that, if desired, the locking pins 39 may be temporarily removed whereafter the angularity of the parallelogram lingages 36 become freely varable and the soil crumbling member 44 loses its implement-supporting ability and functions substantially only to level and initially crumble the broad strip of soil that is to be worked by the immediately following rotary members 3

The rear soil crumbling member 57A bears against the ground surface, during the operation of the implement, by way of the second horizontal or substantially horizontal portions 59 of the tine-like elements 56. Said elements 56 engage the soil that is pushed rearwardly towards them by the rotary soil working or cultivating members 3 and perform a still further crumbling action thereon. The crumbled earth is distributed substantially uniformly throughout the working width of the implement by the horizontal or substantially horizontal portions 59 of the elements 56 and a thoroughly crumbled and substantially uniformly distributed bed of soil can usually be produced by the implement in a single traverse of the land. The rear soil crumbling member 57a is freely upwardly and downwardly displaceable relative to the frame portion 1, without tilting, due to its indirect connection to said frame portion by way of the parallelogram linkages 54. The free upward and downward movability of the rear soil crumbling member 57A enables that member to follow undulations in the surface of the ground that may be met with during the use of the implement and the fact that it is brought about by way of the parallelogram linkages 54 ensures that said member 57A can move upwardly and downwardly without significant tilting, thus maintaining the optimum position of the rear soil crumbling member 57A relative to the ground surface. Stops 69 are provided in the paths of downward pivotal movement of the upper arms 50 to ensure that, when the implement is lifted clear of the ground for inoperative transport, the member 57A does not move too far downwardly.

As previously mentioned, the axes of rotation of the successive shafts 2, and thus of the successive rotary soil working or cultivating members 3, are spaced apart from one another by distances of exactly, or substantially, 37.5 centimeters. Each rotary soil working or cultivating member 3 has an effective working width of substantially 45 centimeters, i.e. substantially the diameter of the circle that is traced by the tips of the soil working portions of the tines 64 of the member 3 during rotation thereof. The distance of substantially 37.5 centimeters between the axes of rotation of neighbouring members 3 allows the total working width of the implement to be varied so as substantially to correspond to the conventional working widths of other implements or machines that may be used in combination with the soil cultivating implement by varying the total number of rotary soil working or cultivating member 3 that are provided. Purely as an example, a seed drill or a fertilizer distributor may be employed in combination with the soil cultivating implement of FIGS. 1 and 2 of the drawings. With the indicated spacing between the axes of rotation of the successive rotary soil working or cultivating members 3, the implement may have any of a number of different working widths which are all substantially equal to exact multiples of 75 centimeters, the effective combined working width of a single pair of the members 3.

FIGS. 3 and 4 illustrate a rotary soil working or cultivating member that is generally indicated by the reference 171. The member 171 comprises a support 172 that is connected to the lowermost end of the shaft 2 concerned by a substantially triangular hub 173 (see FIG. 15). The support 172 has three arms 174 that project substantially radially with respect to the axis of rotation of the shaft 2 at substantially 120° intervals around that shaft. Each arm 174 comprises two substantially parallel spring steel or other resilient strips 175 that lie in spaced apart relationship, the widths of the strips 175 being parallel or substantially parallel to the axis of the shaft 2 concerned. It can be seen from FIGS. 3 and 4 of the drawings that, in fact, the three arms 174 comprise only three of the spring steel or other resilient strips 175 since each strip 175 comprises two integral portions that are inclined at substantially 120° to each other, the two portions respectively corresponding to different ones of the arms 174. At the sharp angular junctions between the two portions of each strip 175, bolts 176 extend substantially parallel to the axis of the shaft 2 carrying the hub 173 and fasten the strips 175 in their appointed positions by co-operating with an underlying substantially triangular clamping plate 177. The outer ends of the two strips 175 of each arm 174 are bent over perpendicularly towards one another and are entered in grooves formed in the outer surface of a corrsponding substantially cylindrical sleeve-like tine holder 178 clamped between them. The clamping is effected by a bolt 179 entered through registering holes in the two strips 175 of the arm 174 immediately adjacent to the holder 178. Apart from their mounting, the holders 178 are analogous to the previously described holders 63 and carry the tines 164 in the same manner as do the holders 63. In this case, the resilient construction of each arm 174 enables each tine to deflect in either of two opposite directions around the axis of the corresponding shaft 2 away from a normal equilibrium position against the resilient opposition of the corresponding pair of strips 175.

The tines which comprise the soil working portions 164 are resiliently deflectable in two opposite, or substantially opposite directions, relative to the corresponding shaft 2. Such deflection is possible in directions that are substantially perpendicular to the axis of the corresponding shaft 2. Since the tines are resiliently deflectable with respect to the shaft 2, their fastening portions and the holders with which those portions co-operate will not readily be damaged or broken during operation as a result of collisions with stones or other firmly embedded obstacles in the soil since the tines can deflect resiliently to circumnavigate such obstacles.

Although certain features of the soil cultivating implements that have been described and/or that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

I claim:

1. A soil cultivating implement comprising a plurality of soil working members mounted on corresponding upwardly extending shafts that define axes of rotation, at least one working member having support means comprising radially extending arms and downwardly extending tines mounted adjacent the outer ends of said arms, said tines extending generally parallel to the corresponding axis of rotation and said arms comprising planar strips of resilient material with respective widths that are substantially vertical, said tines and corresponding strips being deflectable in either of two opposite directions away from a normal equilibrium position, against the resilient opposition of said strips, and substantially perpendicular to the planes of said strips, at least one of said tines having a fastening portion and means mounting said fastening portion between the outer ends of said strips, said mounting means including clamping means and said fastening portion being supported between outer ends by the clamping means.

2. An implement as claimed in claim 1, wherein said strips are substantially parallel to one another.

3. An implement as claimed in claim 1, wherein the planes of said strips are substantially parallel to the axis of rotation of the corresponding soil working member.

4. An implement as claimed in claim 1, wherein said support comprises at least three arms and each arm includes two resilient strips, the strips of one arm being integral with the strips of neighboring arms.

5. An implement as claimed in claim 4, wherein each pair of integral strips is formed at an integral junction therebetween with an angular bend, a fastening adjacent said bend securing a hub of the support means to the corresponding shaft of said working member.

6. An implement as claimed in claim 1, wherein said strips have outer free ends that are bent towards one another.

7. An implement as claimed in claim 6, wherein each tine is mounted in a holder and the ends of said strips engage grooves in the walls of said holder.

8. An implement as claimed in claim 7, wherein two strips of each arm are clamped together by a fastening that draws said strips into engagement with the corresponding holder.

* * * * *